(12) United States Patent
Claeys

(10) Patent No.: US 11,479,969 B2
(45) Date of Patent: Oct. 25, 2022

(54) CURTAIN WALL AND METHOD FOR THE INSTALLATION THEREOF

(71) Applicants: Stephanie Catharina R. Claeys, Zandhoven (BE); Laurens Leonard J. Claeys, Zandhoven (BE); Nausikaa Els P. Claeys, Zandhoven (BE)

(72) Inventor: Eric Claeys, Zandhoven (BE)

(73) Assignees: Stephanie Catharina R. Claeys, Zandhoven (BE); Laurens Leonard J. Claeys, Zandhoven (BE); Nausikaa Els P. Claeys, Zandhoven (BE)

( * ) Notice: Subject to any disclaimer, the term of this patent is extended or adjusted under 35 U.S.C. 154(b) by 0 days.

(21) Appl. No.: 17/420,403

(22) PCT Filed: Jan. 9, 2020

(86) PCT No.: PCT/IB2020/050133
§ 371 (c)(1),
(2) Date: Jul. 2, 2021

(87) PCT Pub. No.: WO2020/148608
PCT Pub. Date: Jul. 23, 2020

(65) Prior Publication Data
US 2022/0081898 A1    Mar. 17, 2022

(30) Foreign Application Priority Data
Jan. 15, 2019   (BE) .................................. 2019/5024

(51) Int. Cl.
*E04B 2/96*     (2006.01)
*F24D 3/14*     (2006.01)
(Continued)

(52) U.S. Cl.
CPC .............. *E04B 2/965* (2013.01); *F24D 3/147* (2013.01); *F24D 13/024* (2013.01); *E06B 9/24* (2013.01)

(58) Field of Classification Search
None
See application file for complete search history.

(56) References Cited

U.S. PATENT DOCUMENTS 3,223,209 A * 12/1965 Skromeda ............... E04B 2/766
                                                          52/235
3,266,210 A *  8/1966 Grossman ................. E04B 2/96
                                                          52/690

(Continued)

FOREIGN PATENT DOCUMENTS

CA     2860242 A1    10/2014
DE     4307558 A1     9/1994
(Continued)

OTHER PUBLICATIONS

ISR and Written Opinion in corresponding PCT Application No. PCT/IB2020/050133 dated Jul. 8, 2020.

(Continued)

*Primary Examiner* — Joshua K Ihezie
(74) *Attorney, Agent, or Firm* — Bacon & Thomas, PLLC

(57) ABSTRACT

A curtain wall includes one or more mullion profiles and one or more transom profiles and panels which are mounted in the mullion profiles and in the transom profiles by their edges. The one or more mullion profiles extend vertically and are provided with an undercut groove on two opposite sides which has an access opening. The grooves form a rebate in which the rim of a panel is mounted. The undercut groove has an elongate cross section which is provided, at the one or several of the transverse ends, with a rounded section and/or which is free from roundings with a radius of (Continued)

less than 2 millimeters at one or several of the transverse ends.

7 Claims, 7 Drawing Sheets

(51) Int. Cl.
*F24D 13/02* (2006.01)
*E06B 9/24* (2006.01)

(56) References Cited

U.S. PATENT DOCUMENTS

| | | | | |
|---|---|---|---|---|
| 3,548,558 | A * | 12/1970 | Grossman | E04B 2/965 52/235 |
| 8,800,221 | B1 * | 8/2014 | Header | E04B 2/88 52/220.8 |
| 2014/0247475 | A1 * | 9/2014 | Parker | G02F 1/163 359/275 |
| 2017/0040940 | A1 * | 2/2017 | Ting | E04B 2/965 |
| 2018/0090992 | A1 * | 3/2018 | Shrivastava | H02J 50/20 |
| 2019/0085618 | A1 * | 3/2019 | Al Kassas | E04B 2/967 |
| 2019/0267840 | A1 * | 8/2019 | Rozbicki | H02J 7/025 |
| 2021/0262230 | A1 * | 8/2021 | Golan | E04B 1/806 |

FOREIGN PATENT DOCUMENTS

| | | |
|---|---|---|
| DE | 19859520 A1 | 6/2000 |
| KR | 1020110045521 | 5/2011 |
| KR | 101930724 | 12/2018 |
| WO | 8804755 A1 | 6/1988 |
| WO | 2017201588 A1 | 11/2017 |

OTHER PUBLICATIONS

Second Written Opinion in corresponding PCT Application No. PCT/IB2020/050133, dated Nov. 24, 2020.
International Preliminary Report on Patentability in corresponding PCT Application No. PCT/IB2020/050133, dated Apr. 6, 2021.
BE Search Report in corresponding BE Application No. 201905024, dated Sep. 30, 2019.

* cited by examiner

CURTAIN WALL AND METHOD FOR THE INSTALLATION THEREOF

BACKGROUND OF THE INVENTION

The present invention relates to curtain walls and to a method for the installation thereof.

A curtain wall is a structure comprising mullion profiles and transom profiles in which panels, usually glass panels, but possibly also closed panels, are placed in order thus to form an external wall of a building.

A drawback of the known curtain walls is that the mullion profiles and transom profiles have been designed in such a way that they have to be built up from the outside to form a structure of profiles. Moreover, thereafter the panels have to be installed from the outside. This is complicated, in particular if it has to be carried out at an elevated level, and requires scaffolding or suspended working platforms and is dangerous for the people doing this work and for the people situated underneath them.

Also, the known systems of mullion profiles and transom profiles require a large number of components and a large number of operations to assemble them.

U.S. Pat. No. 3,266,210 discloses a curtain wall structure comprising transom profiles which are installed between the mullion profiles. With this known structure, the transoms are click-fitted in place in the mullions, which has the drawback that the transoms may also become detached again in an undesired way. Another significant drawback of this known structure is that it does not offer a solution for the problems regarding the tolerances. Seeing as with a curtain wall, there are two types of tolerances, on the one hand, the manufacturing tolerances due to the limitations relating to precision during production, and, on the other hand, the fitting tolerances due to fitting in situ. The production tolerances comprise both the extrusion tolerance and the tolerance during further treatments of the respective profiles. In addition, the transom profiles have to be installed between the mullion profiles with a degree of play at their ends in order to allow for, on the one hand, the thermal dilatations of the transom profiles and, on the other hand, the differential settlement of a building, which are unavoidable and inherent to an unfinished concrete or steel structure. However, this results in the connection between the mullions and transoms not being watertight, which may cause leaks, which is obviously unacceptable for a façade.

The curtain wall structure of US'210 is not very versatile, as it only allows the use of panels, such as glass panels, of one predetermined thickness.

WO 2017/201588 discloses a curtain wall in which the connection between the transom profile and the mullion profile forms a barrier to water in such a way that water which penetrates into the chambers of the mullion profiles, for example via the rubber seal against which the window bears, can be dissipated to the transom profile and drained off to the outside. In addition, the system from WO '588 makes it possible to use panels, such as glass panels, of different thicknesses by selecting suitable glazing beads which hold the respective panel in place along the inside of the curtain wall. The curtain wall of the WO'588 may be installed on the inside of the building.

SUMMARY OF THE INVENTION

It is an object of the present invention firstly an alternative curtain wall, which, according to various preferred embodiments, offers a solution for one or several problems associated with the prior-art curtain walls.

According to a first independent aspect, the invention to this end relates to a curtain wall which comprises one or more mullion profiles and one or more transom profiles and panels which are mounted in the mullion profiles and preferably also in the transom profiles by their edges, wherein the one or more mullion profiles extend vertically and are provided with an undercut groove on two opposite sides which has an access opening, which grooves form a rebate in which the rim of an abovementioned panel is mounted, wherein the one or more transom profiles extend horizontally between two mullion profiles and are mounted in the abovementioned grooves of these two mullion profiles by their ends, characterized by the fact that the abovementioned undercut groove has an elongate cross section which is provided, at one or several of the transverse ends, with a rounded section and/or which is free from roundings with a radius of less than 2 millimeters, or is even free from roundings with a radius of less than 5 millimeters, at one or several of the transverse ends. The fact that one or several of the transverse ends of the undercut groove are provided with a rounded section or with roundings of 2 millimeters or more, or even 5 millimeters or more, results in various advantages. Thus, for example, such a geometry of the undercut groove makes it easier to achieve a completely or partially water-tight connection between the abovementioned transom profiles and the mullion profiles, than is the case with an undercut groove with a rectangular cross section. In the latter case, it is difficult to achieve water-tightness at the location of the corners.

Preferably, a head is provided on at least one, and preferably on both, the abovementioned ends of the transom profiles which makes contact with one or several of the abovementioned transverse ends of the undercut groove. At the location of the respective contact, the head material is preferably compressed. Due to the material of the surface of the head being compressed, it is possible to achieve a water-tight and/or airtight connection between the transom profile and the mullion profile, even with a difference in geometry between the head and the respective transverse end, for example due to tolerances. Preferably, the head consists entirely, or at least on its surface where the connection is to be formed, of a material which is more readily compressible or softer than the material of the abovementioned transom profile. The head preferably consists of a separate portion which is attached to the end of the respective transom profile. According to an alternative, the head may also be designed to be made as a single piece with the respective transom profile. Thus, for example, the transom profile may consist of a rigid core, for example made of aluminum or hard PVC (polyvinyl chloride), namely PVC with a plasticizer content of less than 5 phr, with a softer surface, at least near the abovementioned contact between the head and one or several of the transverse ends. The softer surface may, for example, consists of rubber, PVC with a plasticizer content of more than 5 phr, for example 15 phr or more or be made from polyurethane. The abovementioned softer surface may have been achieved by coating at least one end of the transom profile. According to another alternative, one or both transverse ends of the undercut groove are produced, at least at the location of the abovementioned contact, from a material which is more readily compressible or is softer than the material of the abovementioned transom profile. In the latter case the end of the transom profile or the head may then make contact with the respective transverse end.

Preferably, the connection between the transom profile, more particularly the head provided thereon, and the mullion profile, more particularly the undercut groove, is produced in a purely mechanical way, namely by positioning the transom profile, more particularly the head, in the undercut groove. Preferably, the abovementioned connection is releasable and reconnectable. The abovementioned connection is thus preferably free from adhesives, or other fastening means, such as sealant. As mentioned above, the connection between the head and the undercut groove preferably provides a sealing of the connecting point between the transom profile, more particularly the head, and the mullion profile, more particularly the undercut groove.

It will be clear from the above that the abovementioned ends of the transom profiles are preferably provided with a sealing which forms a barrier against water. In this case, the abovementioned barrier preferably comprises at least one sealing of the abovementioned undercut groove, wherein this sealing is at least partially formed by the abovementioned heads, and more particularly by the contact of the abovementioned heads with one or several of the transverse ends of the undercut groove. Preferably, such a sealing is produced by the connection of the respective head with all walls of the abovementioned undercut groove. In other words, the form of the head is preferably adapted in such a way that it a contact form over both complete transverse ends, and over the most inwardly transverse wall of the undercut groove.

It should be noted that a sealing at the connection points between transom profiles and mullion profiles may result in control of infiltrating water for every individual wall compartment or panel, namely so-called field effect. If all connecting points between transom and mullion profiles which are surrounded by a wall compartment have been sealed, preferably at least by means of contact between the respective head and the undercut groove, so-called field effect may be achieved. Such a field effect makes it easy to detect, more particularly localize, the cause of infiltrating water. With a field effect, such infiltration is specifically due to a leak which is present in the respective wall compartment, and not in adjoining or overhead wall compartments, which is in contrast with traditional curtain walls in which infiltrating water is collected in the mullions across several wall compartments and drained off. It will be clear that leaks in wall compartments and the risk of water seeping in has to be minimized as much as possible and even has to be prevented.

Preferably, the water from the mullion profiles is drained off via one or several openings provided in the transom profile, these openings preferably being at a distance from the mullion profiles, for example at a distance of between 10 and 300 mm. In this way, water may be drained off from each panel or wall compartment. As mentioned above, such drainage is advantageous in order to detect the cause of any infiltrating water. Of course, infiltrating water is undesirable and is to be prevented as much as possible. In such an embodiment, no drains for water have to be provided in the mullion profiles and any water infiltrating in the curtain wall will be drained off to the outside per individual wall compartment.

Preferably, in the cases where the head is provided over the end of the transom profile as a single-piece or as a multipart, yet separate part, a sealing fastening means is provided between the abovementioned head and the respective transom profile. The sealing fastening means may be, for example, an elastic or plastic sealant and/or may be a fastening means based on silicone, a relatively liquid butyl sealant or the like. This prevents water which is situated on the transom profile from being able to find a way between the head and the transom profile, for example due to small deformations of the head. Preferably, the abovementioned head contains one or several openings via which the abovementioned sealing fastening means is applied. Preferably, the head profile comprises at least two openings, namely a first opening via which the fastening means can be added or injected and a second opening which may be used as a monitoring opening. The monitoring opening may, for example, be positioned in such a way that if the fastening means emerges from the monitoring opening, it may be decided that sufficient fastening means has been introduced in the first opening.

Preferably, one or several attachment aids for attaching glazing beads are glued into at least one of the abovementioned transverse ends, preferably into the transverse end which is situated on the inside of the curtain wall. Compared to the mechanical connection from the prior art, for example WO 2017/201587, gluing of the attachment aids makes it possible to simplify the geometry of the mullion profiles. If the heads on the transom profiles are provided in the undercut groove of the mullion profiles by means of a rotating movement, this may be achieved without locking elements of a mechanical connection forming an obstruction.

With the same object as in the first aspect, the present invention, according to an independent second aspect, also relates to a curtain wall which comprises one or more mullion profiles and one or more transom profiles and panels which are mounted in the mullion profiles and preferably also in the transom profiles by their edges, wherein the one or more mullion profiles extend vertically and are provided with an undercut groove on two opposite sides which has an access opening, which grooves form a rebate in which the rim of an abovementioned panel is mounted, wherein the one or more transom profiles extend horizontally between two mullion profiles and are mounted in the abovementioned grooves of these two mullion profiles by their ends, wherein the one or more panels are fixed in the mullion profiles along the inside of the curtain wall by means of first glazing beads which are attached to a said mullion profile by means of first attachment aids, characterized by the fact that the abovementioned attachment aids are glued into the undercuts of the undercut groove. Preferably, the abovementioned first glazing beads are each attached by means of several first attachment aids which are situated a distance apart along the mullion profile. As has been mentioned above, gluing the attachment aids may lead to a simplified design of the mullion profiles. Such a simplified design may be produced in such a way that the recesses in the mullion profile can be sealed more easily, for example by means of the ends or heads of the transom profiles, as may be the case with the mullion profiles and the undercut groove of the first aspect.

It should furthermore be noted that fixing each of the abovementioned first glazing beads by means of several first attachment aids which are situated a distance apart along the mullion profile is also advantageous in case the attachment aids are attached to the mullion profiles by means of a mechanical interlocking, or in other words in case the attachment aids are click-fitted.

Preferably, the attachment aids have a surface with one or several ribs. These ribs preferably form a surface which is easier to glue into the abovementioned transverse ends of the undercut groove. The tops of the respective ribs preferably make contact with the surface of one of the abovementioned transverse ends of the undercut groove, while there is space for receiving glue or another hardened fastening means between two neighboring ribs. The transverse ends of the undercut groove are preferably fundamentally free from large irregularities, such as ribs, so that a good sealing at the fastening points between transom profile and mullion profile by means of the abovementioned heads remains possible.

It will be clear that the curtain wall of the second aspect may or may not comprise the characteristics of the first aspect and/or of the preferred embodiments thereof.

With the same object as in the first and in the second aspect, the present invention, according to an independent third aspect, also relates to a curtain wall which comprises one or more mullion profiles and one or more transom profiles and panels which are mounted in the mullion profiles and preferably also in the transom profiles by their edges, wherein the one or more mullion profiles extend vertically and are provided with an undercut groove on two opposite sides which has an access opening, which grooves form a rebate in which the rim of an abovementioned panel is mounted, wherein the one or more transom profiles extend horizontally between two mullion profiles and are mounted in the abovementioned grooves of these two mullion profiles by their ends, wherein the abovementioned ends are formed by heads which are attached to the abovementioned transom profiles, characterized by the fact that the abovementioned heads contain one or several openings via which a sealing fastening means can be or has been introduced, more particularly injected, between the head and the respective transom profile. As mentioned above in the context of the first aspect, this may be a first opening for supplying the fastening means and at least one second opening which can serve as a monitoring opening. It will be clear that the curtain wall of the third aspect may have the characteristics of the first and/or the second aspect. It will furthermore be clear that the invention also relates to a method for the installation of a curtain wall, wherein this method at least comprises the step of providing a preferably sealing fastening means between a head and a transom profile, preferably by means of the abovementioned first opening for the supply, and, optionally, use of the abovementioned second opening as a monitoring opening. Preferably, this involves a method for installing a curtain wall which furthermore has the characteristics of the third aspect, but this is not obligatory. The respective step may be performed before the ends and/or heads of the transom profile are fitted in the mullion profile or while one or both ends or heads of the transom profile are already situated in the undercut groove of the mullion profile, optionally in its final position or orientation.

Preferred characteristics which may be used in embodiments of curtain walls according to the first, the second and/or the third aspect are described below.

Preferably, the curtain wall of the invention furthermore has the characteristics that the abovementioned undercut grooves have an access opening, wherein the access opening has a first fixed dimension or width in a horizontal direction, wherein the transom profiles have a second dimension in a horizontal direction and at right angles to the profile direction of the transom profiles, wherein the second dimension is greater than the first dimension, wherein the transom profiles have a third dimension in a non-horizontal direction at right angles to the profile direction, wherein the third dimension is smaller than the first dimension, so that the ends of the transom profiles, in a rotated position of the transom profiles, in which the direction of the third dimension is horizontal, fit through the access opening and wherein the transom profiles are provided with a locking element, for example in the form of a displaceable bar, wherein the mullion profiles are provided with a locking groove for receiving a part of the abovementioned locking element, for example a part of said bar, in order to thus block a rotating movement of the transom profiles.

The above makes it clear that the curtain walls of the invention may be configured in such a way that they may be installed from the inside of a building without requiring too many operations. Thus, for example, the transom profiles may, in a position rotated about their longitudinal axis, be placed in the access openings and then reach their desired orientation by means of rotation, and be fixed or click-fitted in the undercut grooves, a preferably airtight and/or water-tight sealing of the undercut groove being achieved. During construction of the curtain wall, the transom profiles may be locked by means of the locking element and the locking groove. Thus, for example, a simple displacement of a locking element, for example a bar or slat, may result in sufficiently satisfactory locking action to counter release of the transom profiles which are arranged between the mullion profiles.

Preferably, the mullion profiles are made in one piece or made of several part profiles which are fixedly connected to each other and cannot be detached from one another, preferably in such a way that the width of the abovementioned access opening has a fixed dimension. The respective mullion profiles extend from the inside of the curtain wall to the outside of the curtain wall and accomplish all functions which a prior-art mullion which has been constructed from the outside may have, namely thermal break, drainage for every wall compartment and the like. It will be clear that the mullion profiles are preferably prefabricated, wherein, in those cases where they consist of several fixedly connected part profiles, they are already connected to each other before the curtain wall is installed on site. Preferably, they are delivered on site as a fixedly connected unit. The possibility of working with a prefabricated mullion profile which nevertheless offers drainage for every wall compartment is unique and the curtain wall of the present invention, particularly with the characteristics of the first aspect, offers an ideal solution to this problem. The reason for this is that achieving sealing of the fastening or connecting points between transom profiles and mullion profiles is critical with prefabricated mullion profiles, since there is only a limited possibility, if any, to adjust the stress on a sealing with prefabricated mullion profiles, for example by tightening screws.

The installation of the curtain wall of the invention, namely fastening transom profiles and mullion profiles to each other, is preferably effected without screws. Preferably, the airtight and/or water-tight sealing at the fastening points between transom and mullion profiles is in this case solely achieved by means of the abovementioned contact between the heads and the undercut groove.

The mullion profiles and/or the transom profiles which are used in the context of the present invention preferably comprise a thermal break, for example in the form of a profile part which is made of plastic, and which is then preferably fixedly connected to at least two or exactly two profile parts made of, for example, aluminum, wherein a first profile part may be an inner part profile which is situated on the inside of the façade, and a second profile part may be an outer part profile which is situated on the outside of the façade.

In other words, the mullion profiles and the transom profiles are preferably composite profiles, which are each composed of two or more part profiles, wherein the part profiles are not necessarily made of the same material. As a result thereof, it is possible to achieve a good thermal insulation, for example by using an aluminum outer part profile and inner part profile, these being connected by insulating plastic profiles.

In a preferred embodiment, one or more walls of the grooves are provided with a recess in which some of the transom profiles are situated, the transom profiles being vertically supported by a bottom edge of said recess. The abovementioned recess preferably extends in a horizontal direction through one or several of the transverse walls which delimit the undercuts of the undercut groove. This is an easy way of attaching the transom profiles to the mullion profiles without having to use further fastening pieces. In addition, such a suspension allows the transom profiles to have some play in their profile direction, which is desirable in order to be able to absorb stresses in the curtain wall. The transom profiles are "suspended" in this recess and preferably rest on the mullion profile on both the front and the inside. In this way, the loads on the transom profiles are transferred to the mullion profiles. In addition, with this technique it is possible to achieve a connection between the transom profiles and the mullion profiles which:

- in the x-direction, namely the direction along the axis or longitudinal direction of the transom profiles, on one side of the transom profile, for example the side of the shallowest undercut groove, functions as a fixed support and, on the other side, functions as a sliding support. To this end, some play may be provided between the transom profile end and the end of the hollow chamber of the head into which this profile extends.
- in the y- and z-direction, the two other directions of the forces, may be regarded as being clamped, or at least as elastically clamped.

The abovementioned recess may be formed by milling out, punching out or hacking out the mullion profiles.

In a further preferred embodiment, the transom profiles are Z-profiles, having a first vertical limb which runs upwards and which is situated on the inside of the transom profile, a second vertical limb which runs downwards and which is situated on the outside of the transom profile and a horizontal intermediate piece between the first and the second limb. As a result thereof, the vertical limbs are sufficiently rigid, while the horizontal intermediate piece leave sufficient space to install a panel above the transom profile. In addition, such a transom profile prevents water from seeping in. Preferably, the height of the first vertical limb is 20 millimeters or more, in such a way that there is only a risk of the water on the transom profile moving to the inside at a pressure difference of 200 Pa, due to a hydrodynamic pressure difference.

Preferably, the abovementioned locking groove containing the locking element, for example the bar, is provided on the inside of the second limb in order to block the rotation of the transoms. This makes it easy to displace the rod from the inside during the construction of the curtain wall, in other words from a floor against which the curtain wall is fitted.

Preferably, said undercut grooves on the various sides of the mullion profiles have a different depth. This makes it possible to also displace the panels from the inside by inserting a panel at an angle into the deepest groove, then positioning it in its desired orientation and then displacing it in the direction of the shallow groove.

Preferably, the panels are glass panels. According to a particular embodiment, the panels are so-called "smart glazing" panels, namely glass panels whose transparency, reflection, heat conduction or other properties can be controlled by means of electronic signals.

It will be clear that the outside of the curtain wall is the side which is exposed to atmospheric conditions.

As mentioned above, the undercut grooves, viewed in horizontal cross section and not taking into account their access opening, are preferably elongate in shape, with the transverse ends preferably having a rounded section or having roundings of 2 millimeters or more. This makes it easier to match the shape of the groove and the shape of a water seal barrier to each other in order thus to obtain a good water seal and to easily be able to place or produce such barriers during installation or fitting of the transom profiles.

In another preferred embodiment, the transom profiles are configured in such a way that the part of the transom profiles to which said water is dissipated, is horizontal or slopes towards the outside, wherein the transom profiles comprise a part profile made in one piece, wherein the part profile forms part of said part to which said water is dissipated, and wherein the part profile is provided with a raised edge on the inside of said part. The part profile is made of one piece of aluminum and consequently watertight. Due to the raised edge, leaking to the inside is prevented, even if there were a small amount of water on the transom profiles, provided that this amount does not rise over the edge.

In another preferred embodiment, the abovementioned heads are pre-installed. Preferably, these form barriers against water, preferably because the abovementioned pre-installed heads are made of flexible plastic or rubber, wherein the heads are fitted to the ends of the transom profiles, before the installation of the transom profiles between the mullions, and wherein the shape of the mullion profiles and the shape of the heads are matched to each other in order to obtain a water-tight connection between the transom profiles and the mullion profiles at the location of said fastening points. Such heads are a practical way of producing such a barrier, are durable over time and are able to absorb any small movement of the curtain wall. In this case, the pre-installed heads are pushed over the ends of the transom profiles in a fitted manner, with each sealing piece being sealingly mounted in an abovementioned undercut groove of two opposite mullions and thus forms a sealing between the ends of the transom profiles and the adjoining mullion profiles. In this way, the play between the mullion profiles and the ends of the transom profiles can be sealed in a watertight manner. After all, such play has to be inherently present in order to be able to compensate for inevitable shrinkage and expansion of the transom profiles.

Due to the pre-installed fitting heads, the connection between the mullion profiles and the transom profiles comes about automatically during the installation of the transom profiles between the mullions without any additional operations being required. Preferably, the heads fit in the undercut groove with a clamp fit, namely preferably in such a way that a pressurized contact is produced on all walls of the undercut groove, and preferably along the entire distance or periphery of these walls. As mentioned above, the head and/or the respective walls may be made from softer material for this purpose, such as rubber, soft PVC or polyurethane or acrylate.

In another preferred embodiment, the heads are provided with a deformable hollow chamber in order to facilitate the fitting of transom profiles which are provided with such heads or sealing pieces. Due to this deformable chamber, the heads may be deformed during fitting, which renders fitting easier in view of the limited space which is present in the grooves of the mullion profiles to allow a rotation of the heads in these grooves during installation of the transoms between the mullions, and of the fact that the material of the heads have to be able to fill these grooves in the width direction after installation in order to provide the necessary sealing action.

In another preferred embodiment, a head or sealing piece is provided on each of the two ends of the transom profiles, wherein at least one of both heads is separately displaceable in the profile direction of this transom profile on the transom profile, preferably across a distance of at least 1 and at most 12 mm, in order thus to compensate for small movements. On account of wind and temperature changes, small deformations may occur in the curtain wall over the course of time. In order to ensure that these do not result in excessive stresses which could lead to a break, said displaceability is desirable. This makes it possible to compensate for inevitable changes in length of the transom profiles without compromising the watertightness of the sealing pieces between mullions and transoms.

Preferably, the heads have a flat end wall at right angles to the profile direction of the transom profiles, wherein the end wall is entirely sealed in the profile direction of the transom profiles and bears against a mullion profile, so that the ends of the transom profiles are entirely incorporated in the heads or sealing pieces. In another preferred embodiment, the heads or sealing pieces comprise a flat end wall which runs at right angles to the profile direction of the transom profiles, wherein the end wall is entirely sealed in the profile direction of the transom profiles and rests against a mullion profile, more specifically against the bottom of a groove of the respective mullion profile. As a result thereof, any infiltrating water is prevented from passing through beyond the heads or sealing pieces and from seeping through to a field or wall compartment situated below.

In another preferred embodiment, the transom profiles and the mullion profiles define rectangular openings, wherein one or more panels are placed in said openings in order thus to seal these openings, wherein the one or more panels are fixed by means of first glazing beads which are attached to a said mullion profile by means of first attachment aids, wherein the first attachment aids and the mullion profiles are configured to be able to attach the first attachment aids to a said mullion profile, preferably as in the second aspect by adhesively fixing them in the abovementioned undercut groove or by click-fitting them via mechanical locking elements, wherein the first attachment aids and the first glazing beads are preferably configured to be able to click-fit the first glazing beads onto the first attachment aids. In this way, first glazing beads can easily be attached, simply by click-fitting them. This makes it possible to fit the panels from the inside. As mentioned above, preferably several attachment aids which are spaced apart along the mullion profile are used.

According to an alternative for adhesively fixing the attachment aids or in combination therewith, the first attachment aids and said mullion profiles may be configured to be able to click-fit the first attachment aids onto a said mullion profile in a direction at right angles to the plane of the respective panel, wherein the first attachment aids and the first glazing beads are configured to be able to click-fit the first glazing beads onto the first attachment aids in a direction parallel to the plane of the respective panel. Preferably, however, the attachment aids are only bonded to the mullion profile by means of gluing. Fitting the attachment aids to the mullion profiles may be carried out before the installation of the respective mullion profile, for example as part of a prefabricated mullion profile which is delivered on site as such. However, it is also possible to attach the attachment aids to the mullion profiles after installation of the mullion profiles, for example in connection with fitting the panels and/or the glazing beads.

In another preferred embodiment, the first glazing beads are each attached to a mullion profile by at least two spaced-apart first attachment aids.

In another preferred embodiment, the one or more said mullion profiles and the first glazing beads are configured such that the first glazing beads rest against the mullion profile on their side facing away from the respective panel.

In another preferred embodiment, the one or more panels are fixed by means of second glazing beads which are attached to a said transom profile by means of second attachment aids, wherein the second attachment aids and the one or more said transom profiles are configured to be able to attach the second attachment aids to a said transom profile, wherein the second attachment aids and the second glazing beads are configured to be able to click-fit the second glazing beads onto the second attachment aids. The advantages mentioned in connection with the first glazing beads and the mullion profiles consequently also apply to the transom profiles and the second glazing beads. It will be clear that the attachment aids for the second glazing beads may be attached to the transom profiles in a way which is similar to the way in which attachment aids for the first glazing beads are attached to the mullion profiles.

Preferably, the first and/or the second attachment aids are made of plastic, such as PVC (polyvinyl chloride), PP (polypropylene), PA (polyamide), PE (polyethylene), PET (polyethylene terephthalate) and the first glazing beads are preferably made of aluminum.

It will be clear that the invention according to an independent fourth aspect also relates to a set for constructing a curtain wall having the characteristics of the first, the second and/or the third aspect.

According to an independent fifth aspect, the invention furthermore relates to a method for the construction or installation of a curtain wall, wherein the abovementioned curtain wall comprises one or more mullion profiles and one or more transom profiles, as well as panels which are mounted in the mullion profiles and preferably also in the transom profiles by their edges, wherein the one or more mullion profiles extend vertically and are provided with an undercut groove on two opposite sides which has an access opening, which grooves form a rebate for holding the rim of an abovementioned panel, wherein the one or more transom profiles extend horizontally between two mullion profiles, characterized in that the method comprises at least the following steps:

the step of installing the abovementioned mullion profile, preferably a mullion profile which consists of several fixedly connected part profiles which cannot be detached from each other and have an inner and an outer part profile which is connected by means of one or several plastic profiles;

the step of arranging at least a part of one head, and preferably the entire head, in the abovementioned undercut groove so that it can cooperate with the end of one of the abovementioned transom profiles;

the step of arranging the end of one of the abovementioned transom profiles in an abovementioned part of a respective head, respectively in the entire head, wherein the abovementioned part is already present in the abovementioned undercut groove.

It will be clear that the method of the fifth aspect may optionally include the step of providing a fastening means or sealing means between the respective head and the transom profile. In case a head with openings in the sense of the abovementioned third aspect is used, the fastening means can be supplied or injected via a first opening, wherein the correct execution may optionally be checked by means of a second, monitoring opening.

It will be clear that the method of the fifth aspect can be used with curtain walls which have the characteristics of the first, second, third and/or fourth aspect of the invention. The possibility of providing the heads or sealing pieces in the mullion profiles first can facilitate installation of a curtain wall while still resulting in a good sealing at the fastening point between mullion profiles and transom profiles. Thus, a rotating movement of the transom profile during installation can be prevented.

According to a particular independent aspect, the present invention also relates to a curtain wall which is constructed from profiles and panels, wherein the abovementioned panels comprise at least panels for so-called "smart glazing" and/or panels whose transparency, reflection or heat conduction can be adjusted electronically, characterized by the fact that the connection of the abovementioned "smart glazing" or adjustable panels is executed on the inside of the curtain wall. In general, such "smart glazing" or other adjustable panels comprise glazing which is provided with a data or power cable, optionally provided with a mobile socket or wall socket. According to an important example, the adjustable panels comprise glazing with an integrated, computer-controlled solar control means. As a result thereof, it is for example possible to control the supplied amount of light and heat as a function of the weather conditions.

Panels for "smart glazing" or other adjustable panels are known per se. Such panels may be provided with a mobile socket or wall socket connected to the panel which has to be connected to the facilities of a building by the contractor. If desired, panels for "smart glazing" or other adjustable panels can be controlled wirelessly. In such a case, the panels may be provided with a built-in or pre-installed antenna.

The connection according to the above particular independent aspect preferably relates to a releasable, and preferably reconnectable, connection with a mobile socket or wall socket which is connected to the respective panel. It may, for example, be a connection in which the contact point of the utility of the building, for example the facilities present in the mullion profiles, such as a BMS (Building Management System), is electrically coupled in a mechanical way to the contact point of the wall socket or mobile socket provided on the respective panel. Preferably, the mechanical coupling is designed to be releasable, preferably at least in such a way that the coupling is reconnectable, and more preferably entirely without damage.

As mentioned above, the connection according to the above particular independent aspect is situated location on the inside of the curtain wall. In this way, the risk of infiltrating moisture damaging the connection can be limited. Preferably, the wall socket of the respective panel is situated on the inside of the curtain wall and, preferably, no further interruptions or connections are available between the connection on the inside of the curtain wall and the respective panel, in such a way that electrical or electronic components which are situated in the humid parts of the curtain wall are limited as far as possible, for example to electrical or electronic lines which are protected against moisture and/or other atmospheric conditions by a suitable sleeve. Preferably, passing the abovementioned electrical or electronic lines to the inside of the curtain wall involves at least one passage through a hole or slot in the profiles or glazing beads of the curtain wall, wherein the abovementioned passage or slot comprises a seal, preferably a prefabricated seal, for example in the form of a rubber seal. Preferably, the passage or slot is configured in such a way that the mobile socket or wall socket can be passed through it. Preferably, the passage or slot is sealed around the abovementioned electrical or electronic line without the use of a paste, a sealing compound, such as a silicone kit, or another sealing material which can be applied in liquid form.

Preferably, the abovementioned connection is situated on the top side of the respective panel. The risk of moisture infiltrating is smallest on the top side and any passage leading to the inside of the curtain wall only marginally increases this risk.

Preferably, the connection of the particular independent aspect is accessible from the inside of the curtain wall. To this end, the connection may be positioned in different ways and some possibilities are listed below, although this list is not exhaustive.

According to a first possibility, the connection is visible and directly accessible on the inside of the curtain wall.

According to a second possibility, the connection is situated behind a removable profile, which is for example click-fittable. Such a profile may be attached, for example, to one or several of the profiles of the curtain wall. Thus, such a removable profile may for example be provided on an optional transom profile which extends horizontally on the top side of the respective panel.

According to a third possibility, the connection is situated behind optional glazing beads.

The accessibility of the connection from the inside of the curtain wall is advantageous during installation and when diagnosing possible problems concerning the smart-glazing panels or other adjustable panels.

It will be clear that the invention of the above particular independent aspect may be used in combination with the curtain walls of the first, second, third and/or fourth aspect, or with curtain walls constructed according to the fifth aspect.

In general, the invention of the particular independent aspect is preferably used with curtain walls which can be constructed from the inside and/or with a curtain wall which comprises one or more mullion profiles and one or more transom profiles and wherein the abovementioned panels are mounted in the mullion profiles and in the transom profiles by their edges, wherein the one or more mullion profiles extend vertically and are provided with a groove on two opposite sides which has an access opening, which grooves form a rebate in which the rim of an abovementioned panel is mounted, wherein the one or more transom profiles extend horizontally between two mullion profiles and are mounted in the abovementioned grooves of these two mullion profiles by their ends. Preferably, the abovementioned panels are installed in the mullion profiles and transom profiles by means of glazing beads.

Preferably, ducts which are provided in the curtain wall are used as an inlet for the utility lines for connection to the respective panels. Thus, for example, the utilities are supplied via spaces provided in the mullion profiles of a curtain wall with mullion and transom profiles. Preferably, these are spaces which are protected against atmospheric influences from the outdoors.

In case the abovementioned panels are installed by means of glazing beads, preferably at least one of the abovementioned glazing beads comprises a passage opening for passing through the connection of the respective panels to the inside of the curtain wall. Preferably, the respective passage opening is positioned on the glazing bead which extends horizontally on the top side of the respective panel.

As mentioned above, it is possible for the abovementioned panels to be connected to an antenna for receiving control signals. In such a case, the antenna is preferably situated on the inside of the curtain wall.

In case the smart-glazing panels or the other adjustable panels do not have to be connected to the utilities of the building, for example if they use an alternative power supply, such as for example a power supply comprising a battery, the alternative power supply is preferably at least partially situated on the inside of the curtain wall. Thus, for example, a possible battery and/or the connection to the respective battery may be provided in similar ways to those explained above for connecting the utilities of a building.

According to the most preferred embodiment of the abovementioned particular independent aspect, the connection of the adjustable panels is preferably situated in a space which is separated from the space in which the edges of the panels are situated. The separation from the space in which the edges of the panels are situated preferably comprises at least one profile wall, either from a transom profile, a mullion profile or a glazing bead, wherein this profile wall then preferably has a passage opening for the power cable, wherein the optional passage opening is preferably sealed by means of a prefabricated seal, as described above. It will be clear that, according to the particular independent aspect, the abovementioned space in which the connection is situated, is located more towards the inside of the curtain wall or the building than the edges of the panels.

As has already been mentioned, the invention of the particular independent aspect is preferably used with a curtain wall which can be installed from the inside, as is the case with a curtain wall which substantially consists of mullion profiles and transom profiles, wherein at least the mullion profiles is made in one piece or from several part profiles which are fixedly connected to each other and cannot be detached from one another, preferably in such a way that the width of the access opening has a fixed dimension. It will be clear that this may in this case involve a curtain wall which furthermore has the characteristics of one or several of the first, second, third and/or the fourth aspect and/or is constructed according to the fifth aspect of the invention.

The installation of smart glazing or other adjustable panels in a curtain wall which has the characteristics of the above particular independent aspect and/or the preferred embodiments thereof, may offer a number of significant advantages, such as for example:

ease of installation; the connections can easily be tested, for example per floor;
free from uncontrolled bores, but only prefabricated bores for the passage of cables, and corresponding rubber seals, for the most effective sealing result;
connection is situated on the dry side of the curtain wall;
in case of a technical fault, it is easy to check and repair the connection or even the respective panel, all this completely from the inside.

The curtain wall obtained according to one or more of the above described aspects may be installed from the inside, as mentioned above, and consequently offers several possibilities for incorporating utilities. According to a particular possibility, heating and cooling may be incorporated in the mullion and/or transom profiles. The reason for this is that the present inventors are of the opinion that the aluminum construction of a curtain wall would be ideally suited to as a heat-regulating surface. The mullion and transom profiles extend across the surface of the wall like fins and are ideal to distribute heat or cold. In addition, the source of heat is at an optimum location, namely virtually against the surface of the glazing. Such positioning results in less heat or cold radiation of the glazing and therefore more comfort for people in the space, and lower energy consumption since heating or cooling takes place where the cooling or heating, respectively, takes place via the glazing or curtain wall.

As a result of incorporating of a cooling and/or heating system in a curtain wall, the need to place separate cooling or heating modules in the building is reduced or completely absent, which results in a saving in space and costs.

From the above, it is clear that the present invention, according to a second particular independent aspect, also relates to a curtain wall which comprises one or more mullion profiles and one or more transom profiles and panels which are mounted in the mullion profiles and in the transom profiles by their edges, wherein the one or more mullion profiles extend vertically and the one or more transom profiles extend horizontally between two mullion profiles, characterized by the fact that the abovementioned mullion and/or transom profiles comprise heating elements and, preferably, substantially consist of aluminum. The heating elements may comprise electrical and/or hydraulic lines, for example comprise one or several heat exchangers. The abovementioned heat exchangers may be convectors and/or radiators.

BRIEF DESCRIPTION OF THE DRAWINGS

In order to show the characteristics of the invention in more detail, some preferred embodiments are described below by way of example and without being limited thereto, with reference to the accompanying drawings, in which:

FIG. 3;

DETAILED DESCRIPTION OF THE INVENTION

Figure 1:
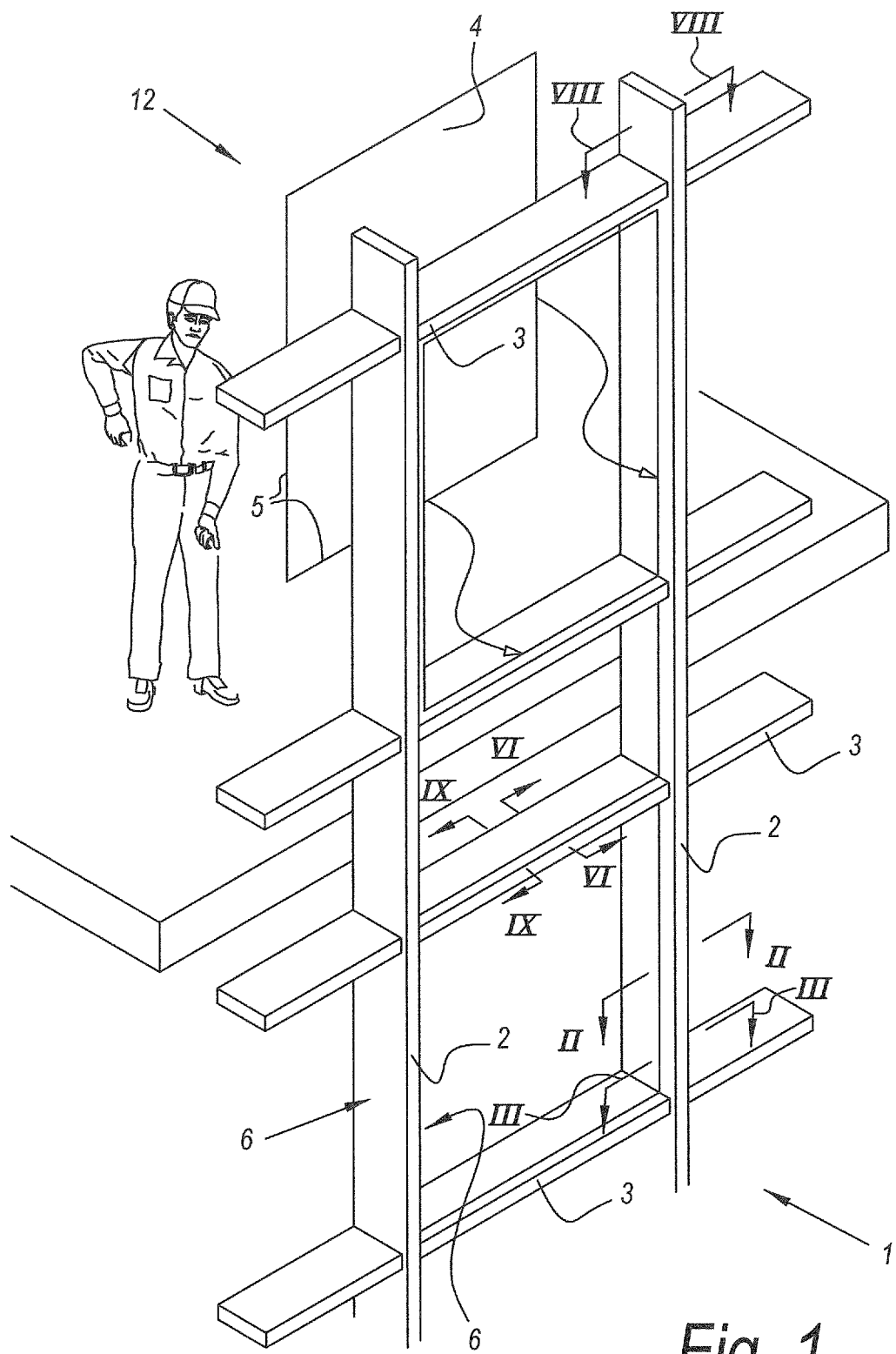
FIG. 1 shows a curtain wall comprising the characteristics of the invention.

FIG. 1 shows a curtain wall 1 during construction. The curtain wall 1 comprises mullion profiles 2 and transom profiles 3. Panels 4, such as glazing, are mounted, by means of their edges 5, in the mullion profiles 2 and in the transom profiles 3. The mullion profiles 2 extend vertically and the transom profiles 3 extend horizontally. The example concerns profiles 2-3 which have been delivered on site as prefabricated profiles. The entire curtain wall 1, including panels 4, can be installed from the inside.

Figure 2:
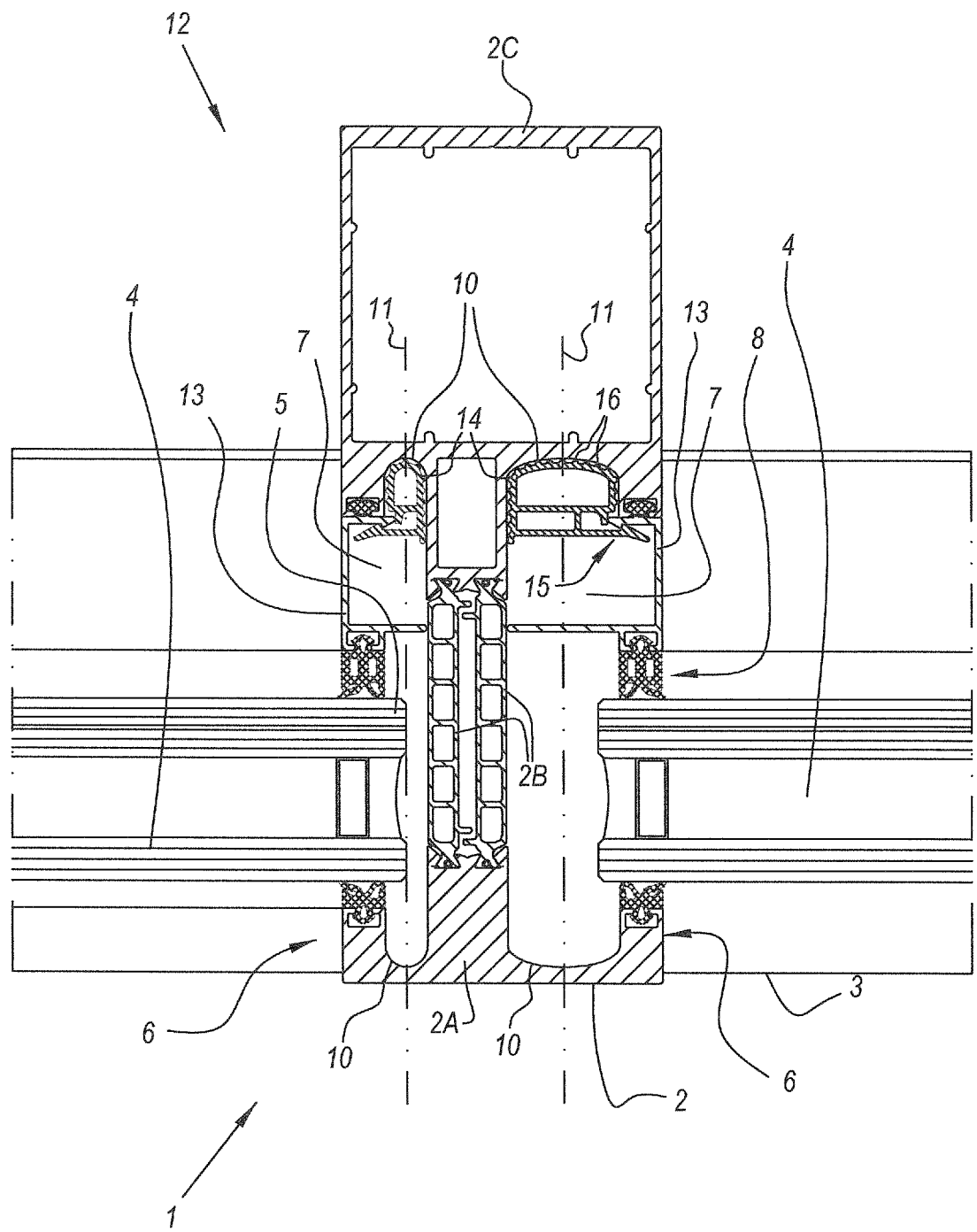
FIGS. 2 and 3 show a cross section on an enlarged scale along the cutting lines II-II and III-III respectively, illustrated in FIG. 1.

FIG. 2 shows that the mullion profiles 2 are provided with an undercut groove 7 on two opposite sides 6 which has an access opening 8. The groove 7 forms a rebate in which the rim 5 of the abovementioned panels 4 can be fitted. The transom profiles 3 extend horizontally between the two mullion profiles 2. The illustrated mullion profiles 2 comprise several part profiles 2A-2B-2C which are fixedly connected to each other and cannot be detached from one another, including a part profile 2B which forms a thermal break.

Figure 3:
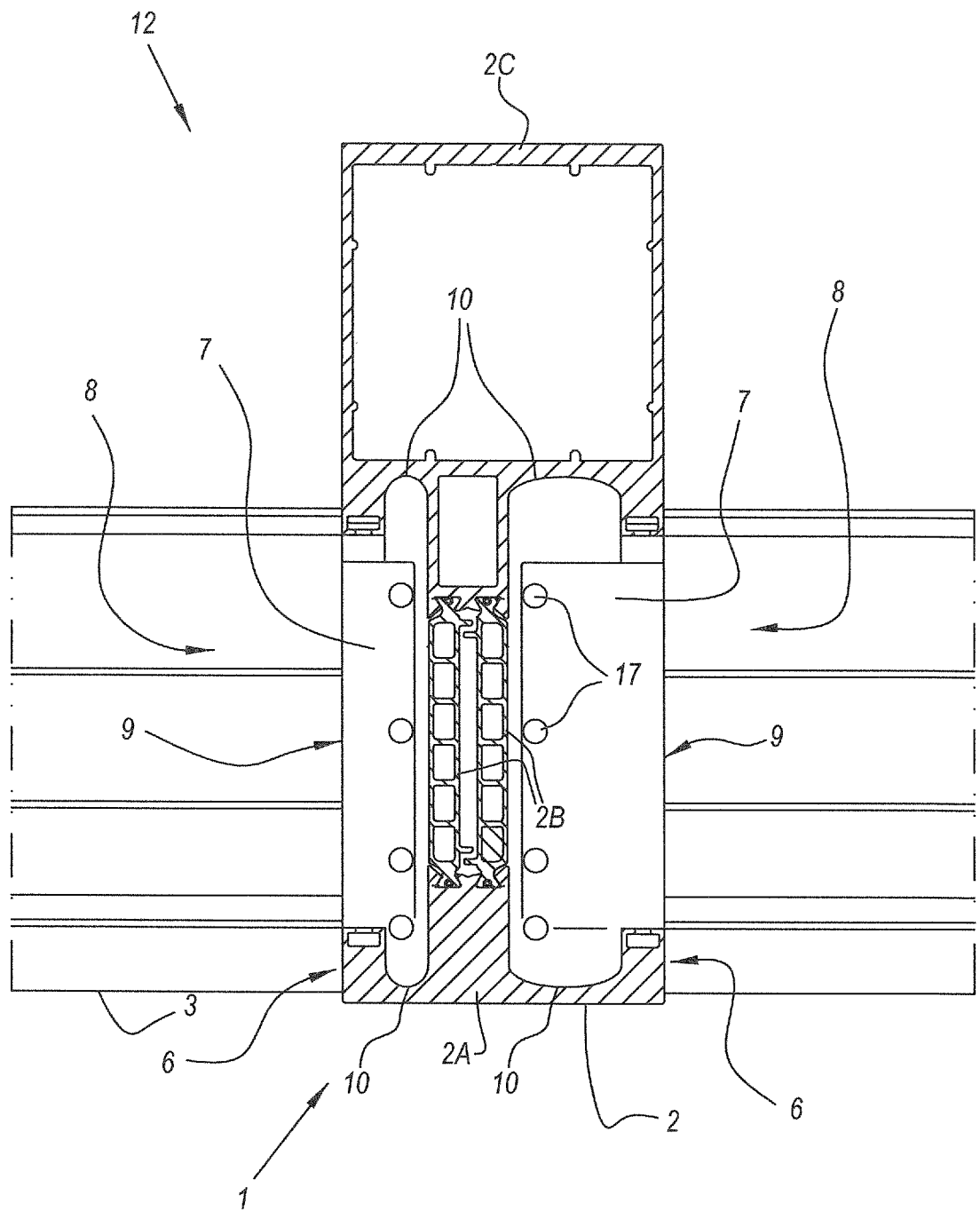

FIG. 3 shows that the transom profiles 3 are mounted in the abovementioned grooves 7 of the mullion profiles 2 by their ends. To this end, heads 9 are fitted over the ends of the transom profiles 3.

What is special about the invention according to its first independent aspect is that the abovementioned undercut groove 7 has an elongate cross section which is designed to have a rounded section at one or several of the transverse ends 10 and, in this case, is free from roundings with a radius of less than 2 millimeters on the transverse ends 10. FIGS. 2 and 3 clearly show that the orientation of the long axis 11 of the abovementioned elongate cross section is transverse or even at right angles to the abovementioned panels 4.

As illustrated in FIG. 2, the abovementioned panels 4 are fixed along the inside 12 of the curtain wall 1 by means of glazing beads 13 which are attached to the abovementioned mullion profile 2, for example, as in this case by means of attachment aids 14 to which the respective glazing beads 13 can be attached by means of mechanical interlocking means 15, more particularly can be click-fitted or snap-fitted, preferably as explained further in comprehensive detail in WO 2017/201587. In the example, the attachment aids 14 are glued to the mullion profile 2 at the location of the transverse end 10 of the undercut groove 7 which is situated on the inside 12 of the curtain wall 1. To this end, the attachment aids 14 in the example are provided with a surface with ribs 16, whose tops make contact with the surface of the respective transverse end 10 while there is space for receiving glue or another hardened fastening means between two neighboring ribs. The transverse ends 10 of the undercut groove 7 are fundamentally free from irregularities, such as ribs.

It should be noted that the attachment aids 14 may be as long as or virtually as long as the glazing beads 13 for which they are intended. However, preferably a glazing bead 13 is attached by means of several attachment aids 14 which are situated above one another at a distance apart, for example three per glazing bead 13. Such an embodiment is an example of the second independent aspect mentioned in the introduction. Thus, for example, the attachment aids 14 may in each case extend over a distance of 2 to 20 cm, for example approximately 5 cm, in the mullion profile 2, at a distance between two neighboring attachment aids 14 of 10 to 50 cm, for example 20 to 30 centimeters.

FIG. 3 clearly shows that the abovementioned heads 9 have a geometry which complements the cross section of the undercut groove 7 and, in the example, makes contact with both transverse ends 10 thereof. As mentioned above, the respective contact provides a watertight and/or airtight connection between the transom profile 3 and the mullion profile 2. Preferably, the contact between head 9 and undercut groove 7, such as in this case, is formed along the entire periphery of the walls of the undercut groove 7.

Figure 4:
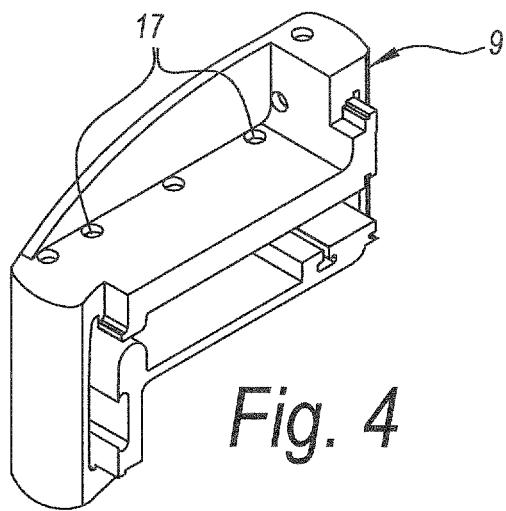
FIGS. 4 and 5 show perspective views of heads which, according to the invention, can be fitted to the ends of the transom profiles.
Figure 5:
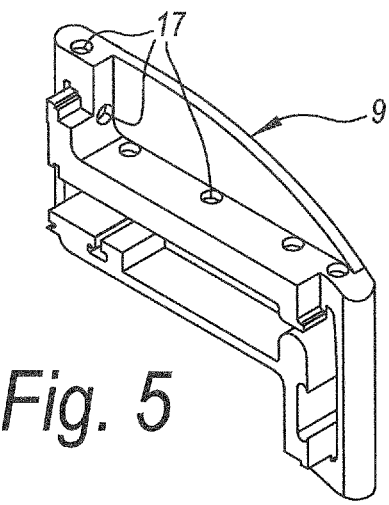

FIGS. 4 and 5 show a perspective view of the heads 9 used in FIG. 3. The respective heads 9 contain several openings 17 via which a sealing fastening means can be introduced or injected. The fastening means is intended to provide a barrier against moisture which is located on the transom profile 3 and which could otherwise find a way to infiltrate between the transom profile 3 and the head 9.

Figure 6:
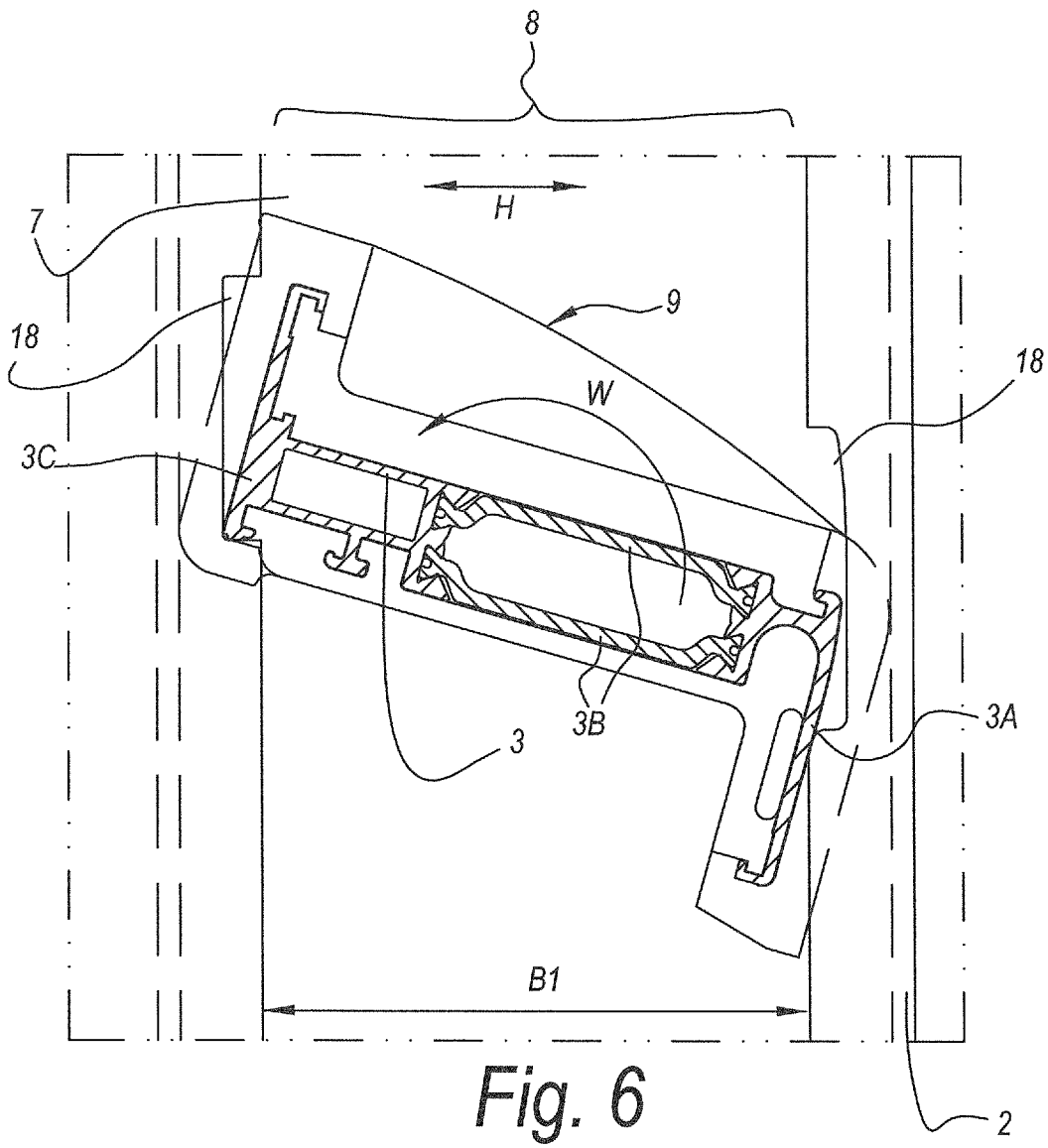
FIGS. 6 and 7 shows a cross section along line VI-VI illustrated in FIG. 1 how the transom profile with the heads can be fitted in the undercut groove.

FIG. 6 shows that the transom profile 3 with the head 9 fitted thereon can initially be presented from the top side and/or at an angle between two mullion profiles 2, namely with the head 9 in the undercut groove 7. Thereafter, the transom profile 3 and the head 9 are turned to the final position, illustrated in FIG. 7, at the location of a recess 18 in the mullion profile 2, for example in a way similar to that which is described further in comprehensive detail in WO 2017/201589. During this turning movement W, compression may occur at the contacts between the respective head 9 and the undercut groove 7, preferably of the material of the head 9, as a result of which the sealing effect at the connecting or fastening point between transom profile 3 and mullion profile 2 can be increased.

Figure 7:
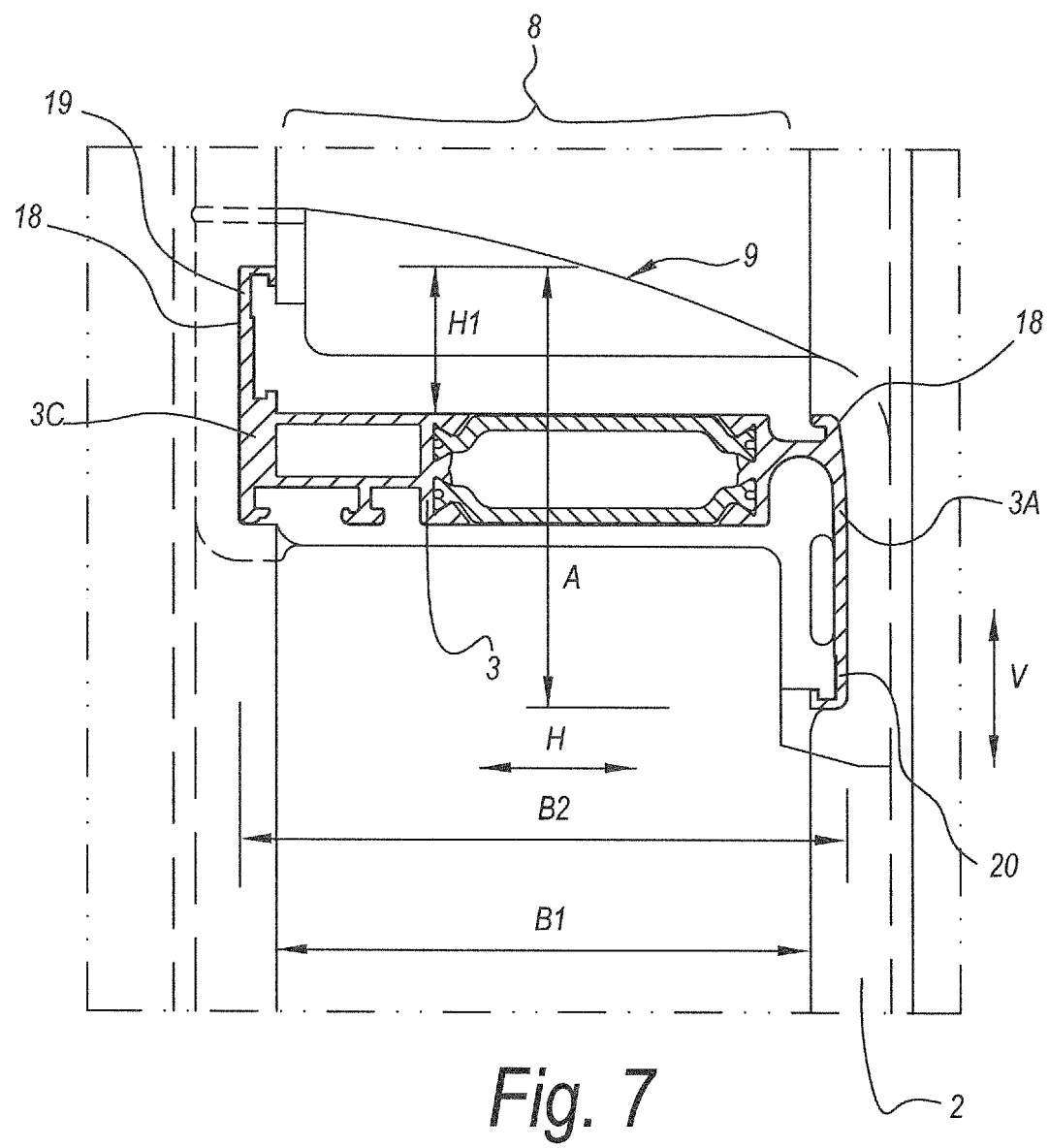

FIGS. 6 and 7 clearly indicate that the undercut groove 7 has an access opening 8 which has a width B1 in a horizontal direction H which is smaller than the width B2 of the transom profiles 3 measured in a horizontal direction H and at right angles to the longitudinal direction of the transom profile 3. In a non-horizontal direction, for example in a vertical direction V, at right angles to the longitudinal direction, the transom profile 3 has a dimension A which is smaller than the width B1 of the access opening 8 of the undercut groove 7, so that the ends of the transom profiles 3, in a rotated position, for example the position from FIG. 6, fit through the access opening 8. Preferably, the transom profile 3 and/or the mullion profile 2 furthermore comprise means to lock the rotation of the transom profile 3 in the final position, for example that of FIG. 7. This is not illustrated here, but may be configured in a similar way as explained more comprehensively in WO 2017/201589.

It will be clear that the installation of mullion profiles 2 and transom profiles 3, and the installation of the panels 4, can be carried out entirely without screws, and this from the inside 12 of the building, while still achieving an airtight and/or watertight connection between mullion profiles 2 and transom profiles 3. In this way, the field effect for the water discharge mentioned in the introduction is achieved.

FIGS. 6 and 7 furthermore show that the transom profiles 3 also comprise several part profiles 3A-3B-3C which are fixedly connected to each other and cannot be detached from one another, including a part profile 3B which forms a thermal break. Preferably, the transom profiles 3 are prefabricated, or they are, in other words, delivered on site in the assembled state.

The example furthermore makes it clear that the undercut grooves 7 on the opposite edges 6 of the mullion profiles 2 preferably have a different depth. Such an embodiment makes it possible to fit the panels 4, such as glazing panels 4, in the curtain wall 1 by means of a so-called shuffle technique, in which the panel 4 is arranged with one edge in the deepest undercut groove 7, is rotated in the plane of the glazing and is then pushed into the less deep undercut groove 7. The glazing is preferably fixed in its final position by means of at least the abovementioned glazing beads 13.

FIGS. 6 and 7 clearly illustrate that the transom profiles 3 may be configured such that at least one first limb 19 projects upwards and which is situated on the inside of the transom profile 3, and preferably a second limb 20 projects downwards which is situated on the outside of the transom profile 3. The one or several limbs 19-20 provide additional flexural strength to the profile. The first limb 19 preferably has a height H1 of 20 millimeters or more, in such a way that a risk of the water on the transom profile 3 infiltrating inwards only exists at a hydrodynamic pressure difference of 200 Pa.

Figure 8:
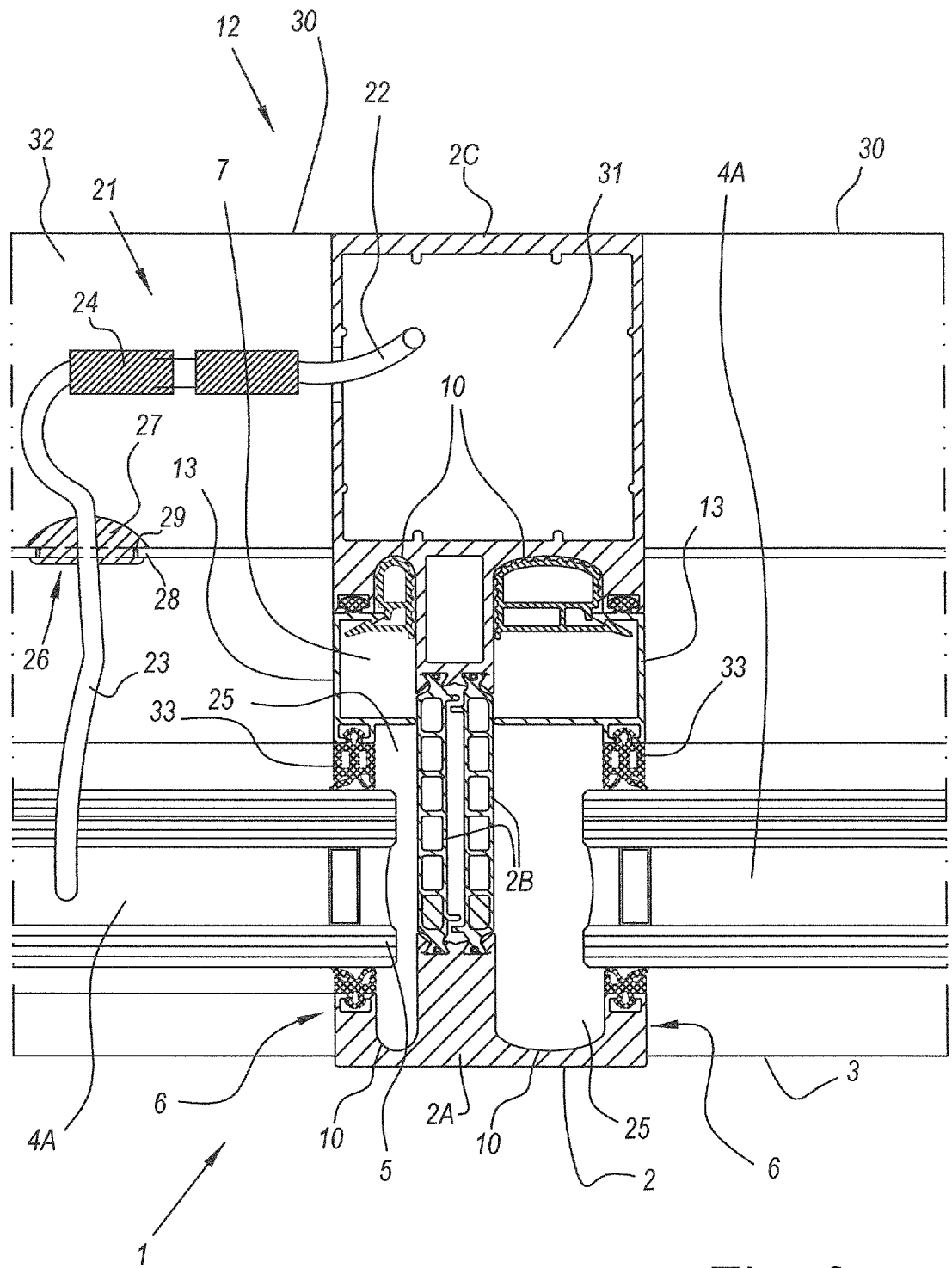
FIGS. 8 and 9 show a cross section along cutting lines VIII-VIII and IX-IX, respectively, illustrated in FIG. 1, of a curtain wall according to the particular independent aspect referred to in the introduction.
Figure 9:
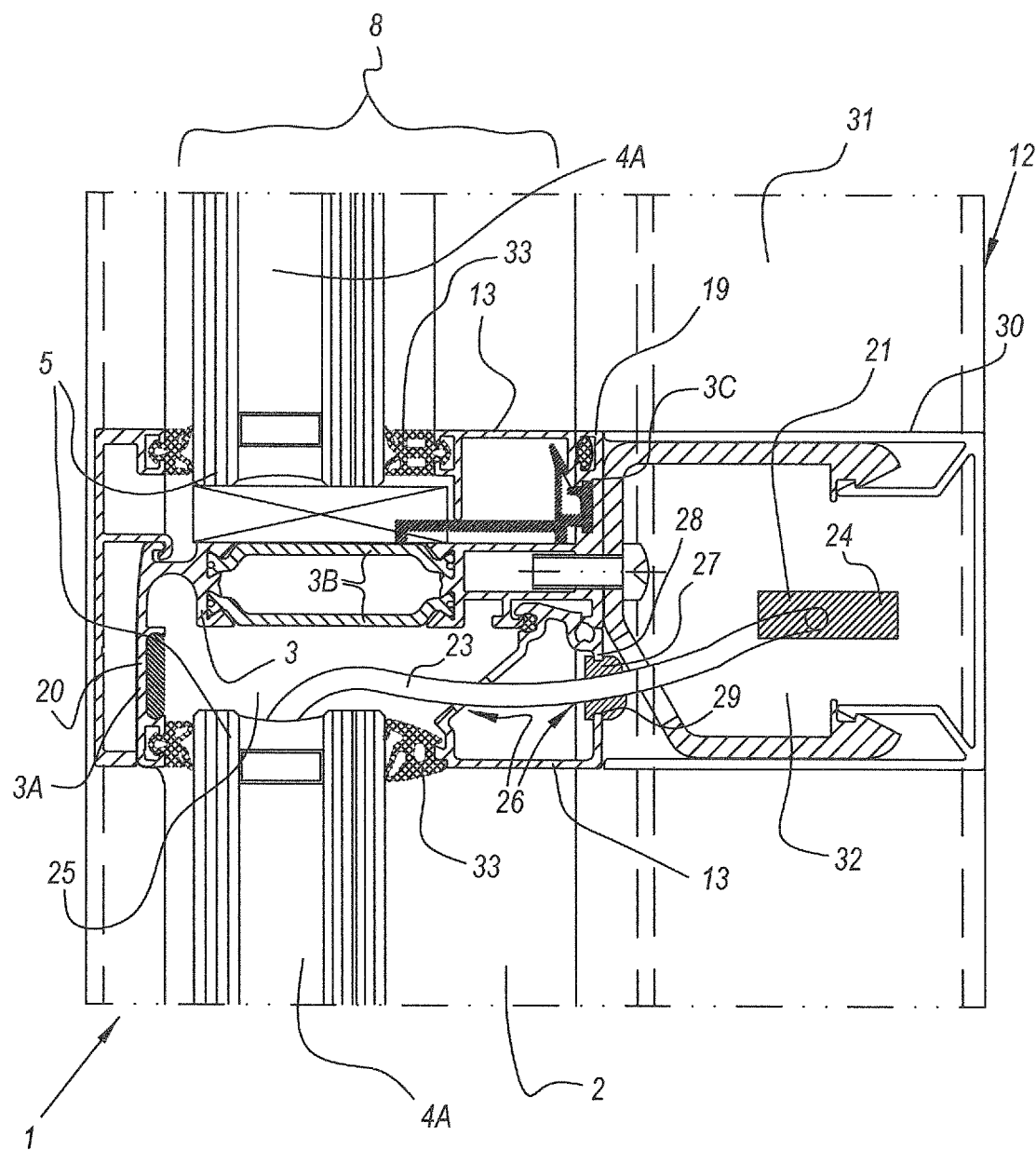

FIGS. 8 and 9 show a curtain wall 1 having the characteristics of the particular independent aspect mentioned in the introduction, namely a curtain wall 1 in which the abovementioned panels 4 are "smart glazing" panels 4A. What is special about the invention according to the particular independent aspect is that the connection 21 of the "smart glazing" panels 4A to the utilities 22 of the building is designed to be on the inside 12 of the curtain wall 1.

As is illustrated, the "smart glazing" panels 4A are provided with a data and/or power cable 23 with a mobile socket 24, and the electrical or electronic coupling to the utility 22 is in this case brought about in a mechanical way, and is preferably releasable and reconnectable. It may, for example, involve a connection identical to the connection between a plug and a socket. The mobile socket 24 is situated on the inside 12 of the curtain wall 1 and there are no further breaks or connections between the mobile socket 24 and the respective "smart glazing" panel 4A. The possibly humid spaces 25 of the curtain wall 1 only contain electrical or electronic lines, such as the power cable 23.

In this case, the abovementioned connection 21 is situated on the top side of the respective panel 4A. Passing the lines, more particularly the power cable 23, to the inside 12 of the curtain wall 1 involves at least one passage 26 through a hole or a slot in the profiles 2-3 or in the glazing beads 13. In this case, the passage 26 to the inside 12 of the curtain wall 1 comprises only holes or slots in the top glazing bead 13, namely the horizontal glazing bead 13 which fixedly secures the panel 4A to the top side. The mullion profiles 2 and the transom profiles 3 are free from passages, in such a way that they can perform their function as airtight and watertight curtain wall 1 as best as possible. The slots or holes used are preferably sufficiently large to allow the mobile socket 24 to be passed through.

FIGS. 8 and 9 show that one or several or all passage holes or slots can be sealed, for example using a prefabricated seal 27 or bush. Preferably, at least one passage hole 26 is sealed, this preferably being, such as in this case, a passage hole 26 between the humid chambers 25 of the curtain wall 1 and the inside 12 of the curtain wall 1. In the example, only the most inward passage 26 through the glazing bead 13 is sealed, but, preferably, the more outward passage 26 through the glazing bead 13 is sealed. Preferably, the sealing is configured in such a way that it can be arranged around the cable 23, for example because it consists of two or more segments which can be joined and attached around the cable 23. Preferably, the sealing is furthermore configured in such a way that it can be fitted in the passage opening 26 and attached, preferably after having been attached to the cable 23. Preferably, the attachment is a mechanical attachment, with the walls 28 of the passage opening 26 being arranged in a recess 29 which is present in the edge of the prefabricated sealing 27.

FIGS. 8 and 9 show that the connection in the example is situated behind a cover profile 30, in this case a click-fittable profile, attached to the transom profile 3.

Referring to FIG. 8, it should be noted that in this case ducts 31 are provided in the curtain wall 1 for passing through the utility lines 22, more particularly in the mullion profiles 2. Preferably, this is a duct 31 such as in this case, which is not in contact with atmospheric conditions, such as moisture and/or wind.

It will be clear that, in the case of panels 4A provided with an antenna and/or a separate power supply, such as with a battery or transformer, and/or with other components connected to the panels 4A via lines, the same principles can be applied as with the particular independent aspect, but instead of, or in combination with, the abovementioned electrical or electronic connection, the antenna and/or the separate power supply and/or other components connected via lines are situated on the inside 12 of the curtain wall 1.

It should furthermore be noted that the instances above which mention an inside 12 of a curtain wall 1, this is understood to mean that part of the curtain wall 1, namely of the transom profiles 3 and the mullion profiles 2, which faces the inside of the building. This inside 12 does not necessarily start only at the most inwardly directed surface of the curtain wall 1, but starts behind the plane of the glazing. According to the particular independent aspect, the connection 21 is thus preferably behind the plane of the glazing.

As in FIGS. 8 and 9, the connection of the panels 4A is preferably situated in a space 32 which is separate from the space in which the edges 5 of the panels 4A are situated. The separation preferably comprises at least one profile wall of a transom profile 3, a mullion profile 2 or a glazing bead 13, wherein this profile wall then preferably has a passage opening 26 for the power cable 23, wherein the possible passage opening 26 is preferably sealed by means of a prefabricated seal 27, as described above.

It will be clear that the connection 21 of the particular independent aspect is preferably situated behind the plane of the glazing, in the direction of the inside 12 of the curtain wall 1, and is preferably also situated more inwardly than the rubber sealings 33 of the glazing, and is situated even more inwardly than the glazing beads 13 which hold the panels 4 in position. The example from FIGS. 8 and 9 shows these preferred characteristics.

The present invention is by no means limited to the above-described embodiments, but such curtain walls and such a method for the installation thereof may be achieved without departing from the scope of the present invention.

The invention claimed is:

1. A curtain wall which comprises one or more mullion profiles, one or more transom profiles and panels,
   wherein the one or more mullion profiles extend vertically and are provided with a groove on two opposite sides which has an access opening,
   wherein the one or more transom profiles extend horizontally between two mullion profiles and are mounted in the grooves of these two mullion profiles by their ends,
   wherein sealing pieces are pre-installed on the ends of the transom profiles,
   wherein the sealing pieces are set sealingly in the grooves of the mullion profiles,
   wherein the edges of the panels are mounted in the grooves,
   wherein the panels are fixed in the mullion profiles and transom profiles by means of glazing beads from an inside of the curtain wall,
   wherein the panels comprise at least panels for smart-glazing and/or panels whose transparency, reflection or heat conduction can be adjusted electronically,
   wherein the smart-glazing panels are provided with a data and/or power cable,
   wherein the data and/or power cable is provided with a mobile socket at its end,
   wherein a top glazing bead of a smart-glazing panel comprises a passage opening for passing through the data and/or power cable and the mobile socket to the inside of the curtain wall, and wherein a connection with the mobile socket of the smart glazing-panels is executed on the inside of the curtain wall.

2. The curtain wall according to claim 1, wherein the connection is situated on the top side of the respective panel.

3. The curtain wall according to claim 1, wherein the connection is accessible from the inside of the curtain wall.

4. The curtain wall according to claim 3, wherein the connection is located in a space behind a cover profile on the inside of the curtain wall.

5. The curtain wall according to claim 1, wherein the passage opening is sealed by means of a prefabricated seal which is arranged around the data and/or power cable.

6. The curtain wall according to claim 1, wherein the smart-glazing panels can be connected or controlled wirelessly,
   wherein the panels are connected to an antenna for receiving control signals, and
   wherein the antenna is situated on the inside of the curtain wall.

7. The curtain wall according to claim 1, wherein the transom profiles are configured to provide a drainage for every wall compartment.

\* \* \* \* \*